United States Patent
Debisschop

[11] Patent Number: 6,135,667
[45] Date of Patent: Oct. 24, 2000

[54] EXPANDING CLAMP FOR SLAP YOKE

[75] Inventor: James G. Debisschop, Morris, Conn.

[73] Assignee: The Torrington Company, Torrington, Conn.

[21] Appl. No.: 09/175,270

[22] Filed: Oct. 20, 1998

[51] Int. Cl.$^7$ .................................................. F16B 1/00
[52] U.S. Cl. .......................... 403/290; 403/373; 403/289
[58] Field of Search .................. 403/373, 379.4, 403/298, 289, 324; 411/34

[56] References Cited

U.S. PATENT DOCUMENTS

| | | | |
|---|---|---|---|
| 3,757,283 | 9/1973 | Kelly | 403/290 X |
| 4,269,106 | 5/1981 | Leibhard et al. | 411/34 |
| 4,306,824 | 12/1981 | Tanaka et al. | 411/34 |
| 4,628,758 | 12/1986 | Yuzuriha et al. | 74/498 |
| 5,090,833 | 2/1992 | Oertle et al. | 403/12 |
| 5,106,224 | 4/1992 | van Gelderen | 403/315 |
| 5,165,817 | 11/1992 | Hoblingre et al. | 403/373 |
| 5,205,688 | 4/1993 | Sundstrom | 411/34 X |
| 5,222,772 | 6/1993 | McGraw | 285/323 |
| 5,577,859 | 11/1996 | Nau | 403/325 |
| 5,628,578 | 5/1997 | McClanahan et al. | 403/290 |
| 5,692,865 | 12/1997 | Pratt | 411/55 |

*Primary Examiner*—Lynne H. Browne
*Assistant Examiner*—John R Cottingham
*Attorney, Agent, or Firm*—Robert F. Palermo

[57] ABSTRACT

A slap yoke, for connection to a non-cylindrical shaft in a rotary-drive device, has an axially extending non-cylindrical socket for radially receiving the non-cylindrical shaft, the socket having two laterally opposed holes in its walls for transverse installation of a clamp bolt. A threaded clamp bolt having a drive head for bearing against the outer surface of one wall of the non-cylindrical socket extends through the opposed holes and carries a cylindrical jacket fitted over the bolt. The jacket has longitudinally centered features for causing radial expansion of the jacket under an axial compressive load. The yoke has a threaded member at one of the opposed holes for receiving the clamp bolt and for causing a compressive axial load on the cylindrical jacket when the clamp bolt is threaded thereinto.

12 Claims, 3 Drawing Sheets

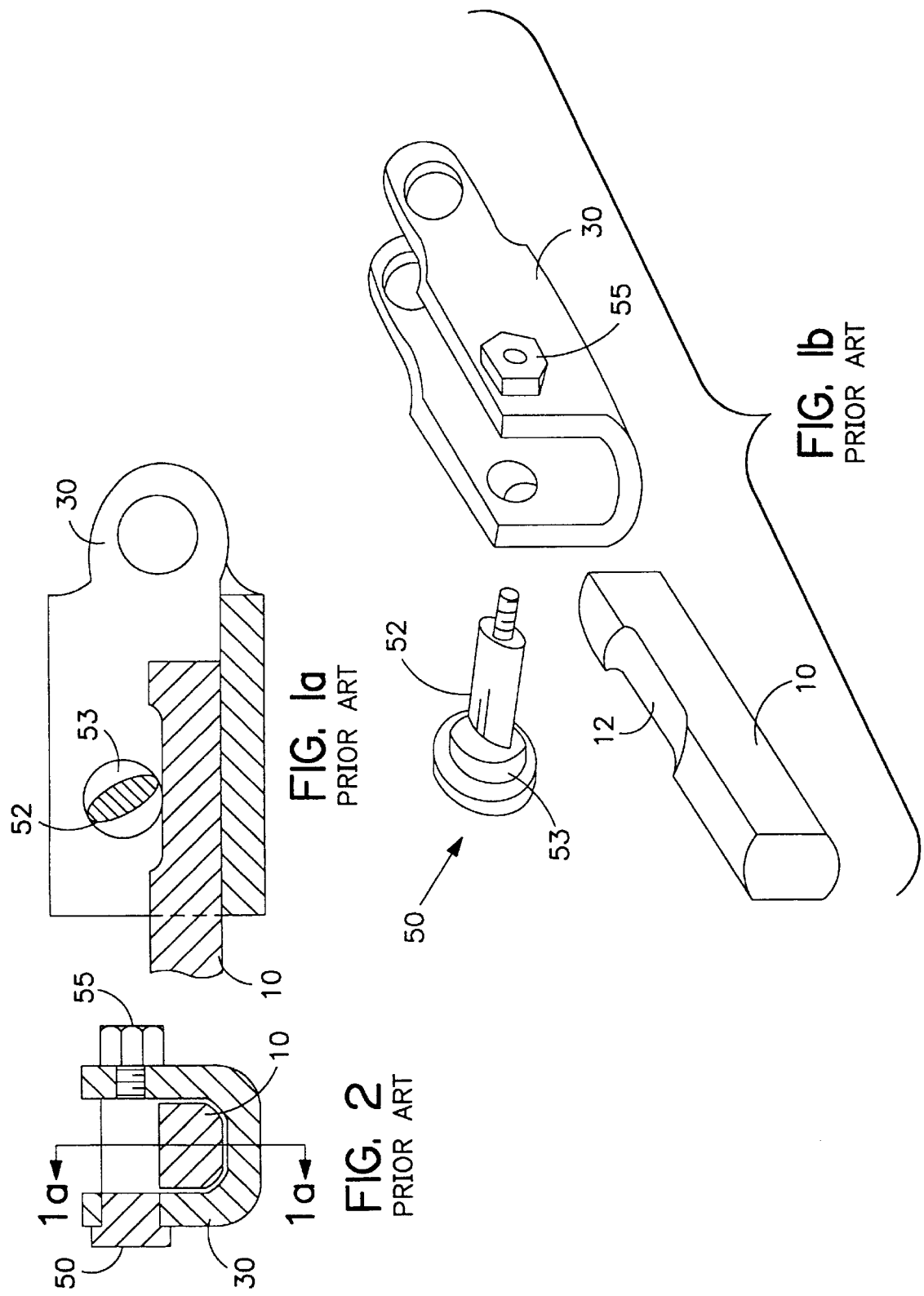

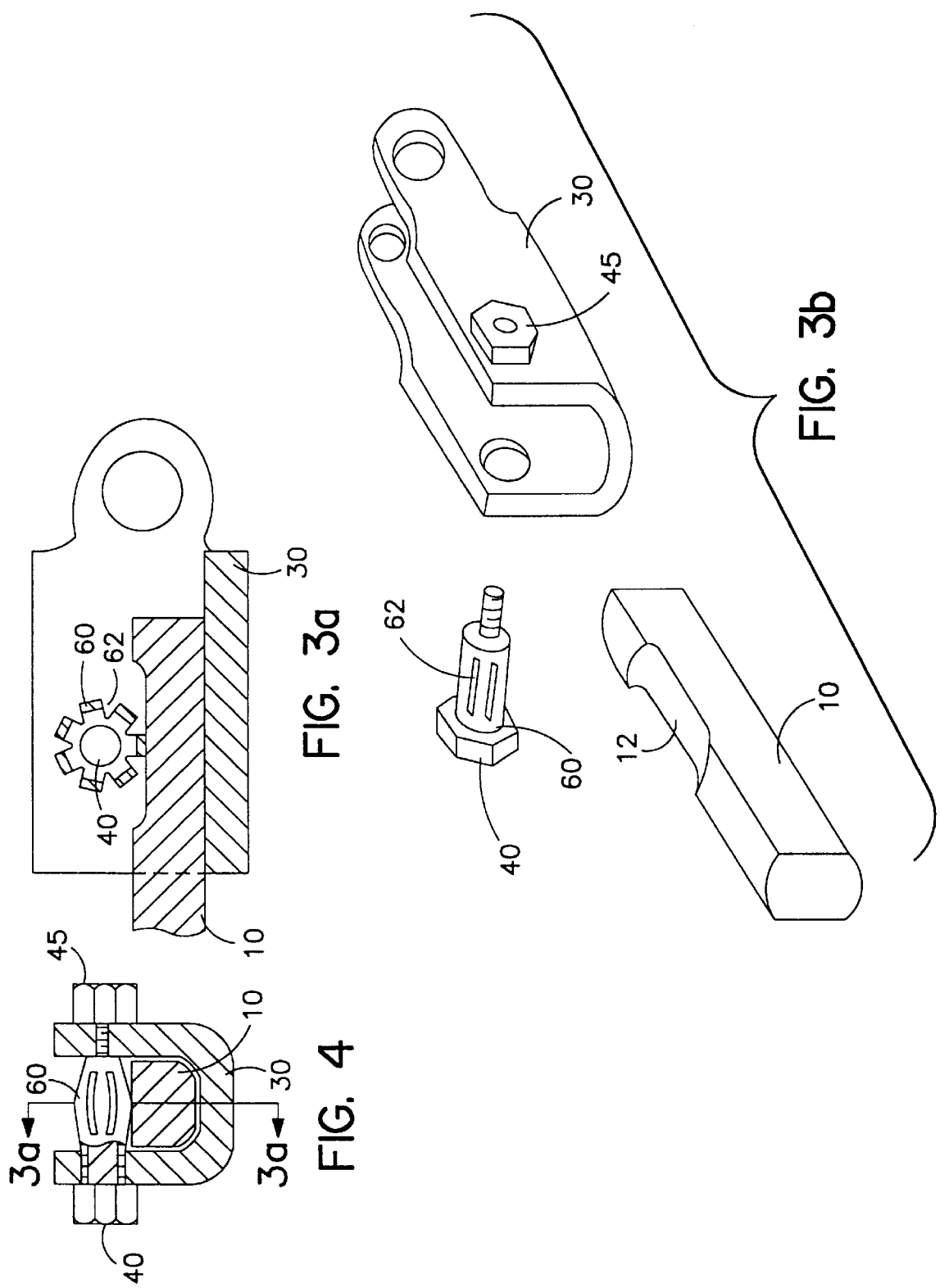

EXPANDING CLAMP FOR SLAP YOKE

BACKGROUND OF THE INVENTION

This invention relates generally to yokes with clamp bolts for securing the yokes on shafts and more particularly to slap yokes, such as are used in vehicle steering columns and other rotary-drive devices, having clamp bolts which not only clamp the yoke to the shaft but also position the shaft within the yoke during clamping.

Rotary shafts are commonly connected using yokes with universal joints to allow for slight and varying misalignments between coupled members. The yokes usually have shaft receiving ends with splines or other non-cylindrical features such as opposed flats to provide rotary drive capability between the shaft and yoke. Slap yokes are often used for such connections. They are made from flat metal plate formed in a U-shaped configuration to provide a socket having holes in its walls for a transverse bolt to provide clamping force to hold the yoke on the shaft. During assembly, the shaft is laid into the socket, pressed against the closed side of the socket, and clamped in place by tightening a bolt inserted through the holes in the walls of the socket. The shaft is also usually formed with an undercut section to coincide with the bolt location and to confine the axial location of the yoke on the shaft within a designed range. It is necessary to force the shaft against the bottom of the U-shaped portion, in order to correctly align the yoke and the shaft. This is usually accomplished by features of the yoke or bolt which provide a radial force against the shaft, from the open side of the U-shaped portion of the yoke, to force the shaft against the closed side.

One approach to radially pressing the shaft against the socket is to provide wedge shaped features at the sides of the yoke which bear against the shaft when the bolt is tightened and force the bolt down against the yoke. Another method employs a nut and a cam bolt which has a single or multi-lobed form along its center and which wedges by cam action against the shaft when torque is applied to the bolt. These and other even more complex methods have been successfully used to provide the required alignment and clamping. All, however, require handling of an excessive number of pieces during installation in close quarters, or they require components which include costly features.

The foregoing illustrates limitations known to exist in present rotary-drive shaft connectors. Therefore, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a slap yoke, for connection to a non-cylindrical shaft in a rotary-drive device. The slap yoke comprises an axially extending non-cylindrical socket, on the end opposite the trunnion end of the yoke, for receiving the non-cylindrical shaft, the socket having two laterally opposed holes in its walls for transverse installation of a clamp bolt. A threaded clamp bolt has a drive head for bearing against the outer surface one wall of the non-cylindrical socket; and a cylindrical jacket is fitted over the bolt, the jacket having longitudinally centered means for causing radial expansion of the jacket under an axial compressive load. The socket has threaded means for receiving the clamp bolt and for causing a compressive axial load on the cylindrical jacket when the clamp bolt is threaded thereinto.

The foregoing and other aspects will become apparent from the following detailed description of the invention when considered in conjunction with the accompanying drawings. In all Figures, common parts are numbered with the same numbers.

BRIEF DESCRIPTION OF THE DRAWINGS

FIGS. 1a and 1b are a schematic longitudinal partially sectional view and an exploded perspective view, respectively, of a slap yoke/shaft assembly using a cam bolt of the prior art;

FIG. 2 is a schematic partially sectional end view of the assembly of FIG. 1;

FIGS. 3a and 3b are a schematic longitudinal partially sectional view and an exploded perspective view, respectively, of one embodiment of an assembly according to the invention;

FIG. 4 is a schematic partially sectional end view of the assembly of FIG. 3;

DETAILED DESCRIPTION

Figure 5A:
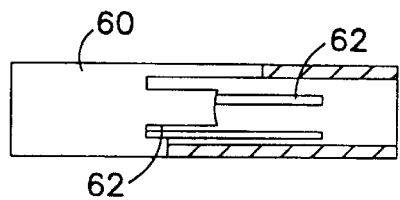
FIGS. 5a, 5b, 5c, and 5d are longitudinal sectional schematic views of four embodiments of the sleeve of the invention.
Figure 5B:
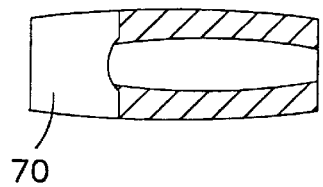
Figure 5C:
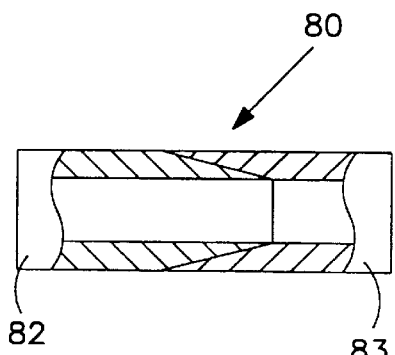
Figure 5D:
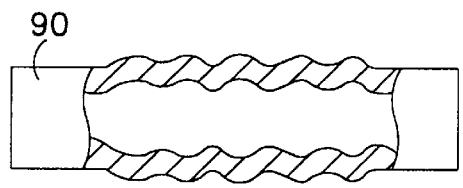

FIGS. 1a, 1b, and 2 show a slap yoke/bolt assembly using a cam bolt of the prior art. It includes a shaft 10, a slap yoke 30, and a clamp bolt 50. The shaft 10 illustrated is a so-called double-D design to provide rotary drive between the yoke 30 and the shaft. It has an undercut 12, which establishes axial position limits of adjustment for the shaft 10 with respect to the yoke 30 during installation in, for example, a steering column of a vehicle. The cam bolt 50 has a head and a shoulder 53. The shoulder 53 has a diameter which is substantially equal to the major dimension of the cam 52 and is sized to fit the first of two opposed holes in the walls of the socket formed in the yoke 30. For assembly, the shaft 10 is laid in the socket of the yoke 30, and the cam bolt 50 is inserted through the first hole with its threaded end reaching through the second opposed hole to engage the nut 55, which may be loose but is preferably rotatably captured on the yoke 30. The nut 55 is then tightened on the cam bolt 50, and the drag of the threads causes the bolt to turn so that the cam presses against the shaft 10, forcing it against the closed side of the socket. Further tightening causes the walls of the yoke 30 to press against the sides of the shaft 10 to clamp the assembly together. The clamp bolt is free to turn under the influence of the thread drag during assembly; because the shoulder 53 is cylindrical. This provides the proper sequence of actions, namely, the cam action pressing the shaft 10 against the socket of the yoke 30, followed by walls pressing to clamp the shaft in the yoke.

The slap yoke assembly of the invention is illustrated in FIGS. 3a, 3b, and 4. The shaft 10 and yoke 30 are the same as before, except that, in this case the nut 45 is fixed to the yoke so that it cannot turn. This may be done by welding or staking or by other well known methods. Another version (not shown) could eliminate the nut 45 and replace it with threads in the second opposed hole of the yoke 30. The bolt 40 has a drive head and is covered by a cylindrical jacket 60. The jacket 60 has axially centered longitudinal slits 62 and an outer diameter substantially equal to that of the first opposed hole, through which it is inserted during assembly. Note that the slits 62 are axially centered on the portion of the jacket 60 that is situated between the walls of the socket. Its length is such as to extend from the distal wall of the socket of the yoke 30 through the proximal wall to contact the head of the bolt 40. Since the diameter of the second opposed hole is less than that of the jacket 60, the jacket rests between the head of the bolt 40 and the wall of the yoke 30 into which the bolt is threaded. As the bolt 40 is tightened it causes a compressive axial stress in the jacket 60, which causes the jacket to bulge at the slits 62 and to press against the shaft 10, as seen in FIG. 4. Further tightening pulls the walls together to clamp the shaft 10 in the yoke 30. This provides the same clamping sequence as the cam bolt of the prior art with less costly components. It should be noted that the force needed to properly seat the shaft 10 against the closed side of the socket in the yoke 30 before clamping is quite small. Therefore, the jacket does not have to be very strong to provide the necessary force, and it can be made in several forms using metals or polymers.

FIGS. 5a, 5b, 5c, and 5d show four possible embodiments of the jacket of the invention. Jacket 60 is described above. Jacket 70 may be made as an injection molded center-bulged cylinder. Another design has a jacket 80 that uses two tapered cylindrical pieces 82 and 83 whose tapers cause radial expansion as the jacket is axially compressed. Another jacket 90 has one or more circumferential ripples which cause a bellows-like radial expansion under axial compression. The amount of radial expansion required depends on the clearance between the bolt 40 and the undercut 12 of the shaft 10. Since this distance is preferably kept very small, the radial expansion, and the axial compression, required is also very small.

Figure 6:
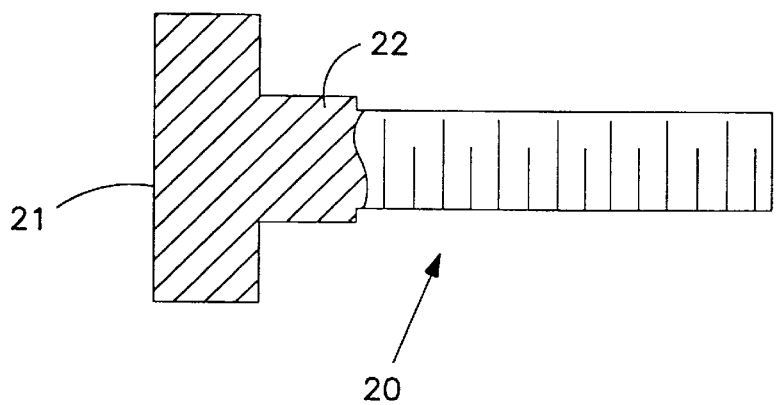
FIG. 6 is a longitudinal sectional view of an alternative embodiment of the clamp bolt of the invention.

The bolt 20 in FIG. 6 has a shoulder 22 and a drive head 21. The shoulder 22 is sized to fit the first of the opposed holes and to provide the axial support to the jacket provided by the head on the bolt 40. The shoulder 22 provides slightly less play in the first hole than does the jacket/bolt combination.

The foregoing discussion is directed to shafts having the double-D configuration, but can apply equally well to other non-cylindrical forms which have the same clamping sequence.

Having described the invention, I claim:

1. A slap yoke for connection to a non-cylindrical shaft in a rotary-drive device, said slap yoke comprising:

an axially extending non-cylindrical socket on an end opposite a trunnion end of said yoke, for receiving said non-cylindrical shaft, said socket having two laterally opposed holes in its walls for transverse installation of a clamp bolt;

a cylindrical threaded clamp bolt having a drive head for bearing against the outer surface of a first wall of said non-cylindrical socket;

a cylindrical jacket fitted over said cylindrical bolt, said jacket having longitudinally centered means for causing radial expansion of said jacket under a compressive axial load; and threaded means on a second wall of said non-cylindrical socket for receiving said threaded clamp bolt and for causing a compressive axial load on said cylindrical jacket when said clamp bolt is threaded thereinto.

2. The slap yoke of claim 1, wherein said longitudinally centered means for causing radial expansion of said jacket comprises a plurality of longitudinal slits in said jacket centered between walls of said socket.

3. The slap yoke of claim 1, wherein said centered means for causing radial expansion of said jacket comprises at least one slight radial bulge in the jacket wall at the center of said jacket.

4. The slap yoke of claim 1, wherein said threaded means for receiving said clamp bolt comprises internal threads in the laterally opposed hole in said second wall.

5. The slap yoke of claim 1, wherein said threaded means for receiving said clamp bolt comprises a nut fixed to said yoke in alignment with and adjacent to the laterally opposed hole in said wall.

6. The slap yoke of claim 1, wherein said cylindrical jacket is made from a polymeric material.

7. A slap yoke for connection to a non-cylindrical shaft in a rotary-drive device, said slap yoke comprising:

an axially extending non-cylindrical socket on an end opposite a trunnion end of said yoke, for receiving said non-cylindrical shaft, said socket having two laterally opposed holes in its walls for transverse installation of a clamp bolt;

a threaded clamp bolt having a drive head for bearing against the outer surface of one wall of said non-cylindrical socket, said bolt having a shoulder adjacent to the drive head;

a cylindrical jacket fitted over said bolt, said jacket having longitudinally centered means for causing radial expansion of said jacket under a compressive axial load, said shoulder having a diameter substantially equal to the outer diameter of said cylindrical jacket and the diameter of the laterally opposed hole through which it is inserted; and threaded means for receiving said clamp bolt and for causing a compressive axial load on said cylindrical jacket when said clamp bolt is threaded thereinto.

8. The slap yoke of claim 7, wherein said centered means for causing radial expansion of said jacket comprises a plurality of longitudinal slits at the center of said jacket.

9. The slap yoke of claim 7, wherein said centered means for causing radial expansion of said jacket comprises at least one slight radial bulge in the jacket wall at the center of said jacket.

10. The slap yoke of claim 7, wherein said threaded means for receiving said clamp bolt comprises internal threads in one of said laterally opposed holes.

11. The slap yoke of claim 7, wherein said threaded means for receiving said clamp bolt comprises a nut fixed to said yoke in alignment with one of said laterally opposed holes.

12. The slap yoke of claim 7, wherein said cylindrical jacket is made from a polymeric material.

* * * * *